US012116074B2

(12) United States Patent
Inoue et al.

(10) Patent No.: US 12,116,074 B2
(45) Date of Patent: Oct. 15, 2024

(54) STORAGE BOX SEAL STRUCTURE

(71) Applicant: HONDA MOTOR CO., LTD., Tokyo (JP)

(72) Inventors: Yoshihiro Inoue, Tokyo (JP); Tsuyoshi Yamada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 97 days.

(21) Appl. No.: 17/951,439

(22) Filed: Sep. 23, 2022

(65) Prior Publication Data

US 2023/0096251 A1 Mar. 30, 2023

(30) Foreign Application Priority Data

Sep. 30, 2021 (JP) ................ 2021-162265

(51) Int. Cl.
*B62J 9/23* (2020.01)
*F16J 15/10* (2006.01)

(52) U.S. Cl.
CPC ...... *B62J 9/23* (2020.02); *F16J 15/10* (2013.01)

(58) Field of Classification Search
CPC .... B62J 9/23; F16J 15/10; F16J 15/027; F16J 15/062
USPC ................................ 220/378, 849
See application file for complete search history.

(56) References Cited

U.S. PATENT DOCUMENTS

| 4,380,304 A * | 4/1983 | Anderson | B65D 43/0212 215/DIG. 1 |
| 2004/0195783 A1* | 10/2004 | Akagi | F16J 15/027 277/645 |
| 2006/0151509 A1* | 7/2006 | Eiskant | A61B 50/31 206/439 |

FOREIGN PATENT DOCUMENTS

| EP | 3 321 157 A1 | 5/2018 |
| JP | 11-192985 A | 7/1999 |
| JP | 2018-075971 A | 5/2018 |

OTHER PUBLICATIONS

Japanese Office Action dated Mar. 28, 2023, Application No. JP 2021-162265, English translation included, 7 pages.

* cited by examiner

*Primary Examiner* — James N Smalley
(74) *Attorney, Agent, or Firm* — Rankin, Hill & Clark LLP

(57) ABSTRACT

A storage box seal structure includes a recess, a seal member provided in the recess, and a projection that comes into contact with the seal member for sealing, and has, at an opening, a centering structure for guiding opening and closing of a lid member. The centering structure includes a first rib and a second rib projecting from opposite edges of the recess, and a guide portion that guides at least one of the first rib and the second rib at opening and closing.

8 Claims, 8 Drawing Sheets

STORAGE BOX SEAL STRUCTURE

INCORPORATION BY REFERENCE

The present application claims priority under 35 U.S.C. § 119 to Japanese Patent Application No. 2021-162265 filed on Sep. 30, 2021. The content of the application is incorporated herein by reference in its entirety.

BACKGROUND OF THE INVENTION

Field of the Invention

The present invention relates to a storage box seal structure.

Description of the Related Art

There is known a conventional storage box seal structure including a seal member provided in a recess, and a projection that comes into contact with the seal member for sealing, in which the sealing is achieved by bringing the projection into contact with the seal member (e.g., refer to Japanese Patent Laid-Open No. 11-192985). In Japanese Patent Laid-Open No. 11-192985, a seal member made of foamed rubber is integrally foam-formed in a recess to prevent the seal member from loosening or coming off.

In a storage box seal structure, a seal member and a projection may become misaligned in a position where they come into contact with each other due to deformation of a lid member or a housing caused by aged deterioration or stored materials or hinge looseness, which may degrade sealability.

An object of the present invention, which has been made in view of the above circumstances, is to position a seal member and a projection of a storage box to improve sealability.

SUMMARY OF THE INVENTION

A storage box seal structure includes: a recess; a seal member provided in the recess; and a projection that comes into contact with the seal member for sealing, in which the storage box seal structure has, at an opening, a centering structure for guiding opening and closing of a lid member, and the centering structure includes a first rib and a second rib projecting from opposite edges of the recess, and a guide portion that guides at least one of the first rib and the second rib at opening and closing.

The storage box seal structure has the centering structure for guiding opening and closing of the lid member and positions the seal member and the projection, thereby improving sealability.

DETAILED DESCRIPTION OF THE PREFERRED EMBODIMENT

Figure 1:
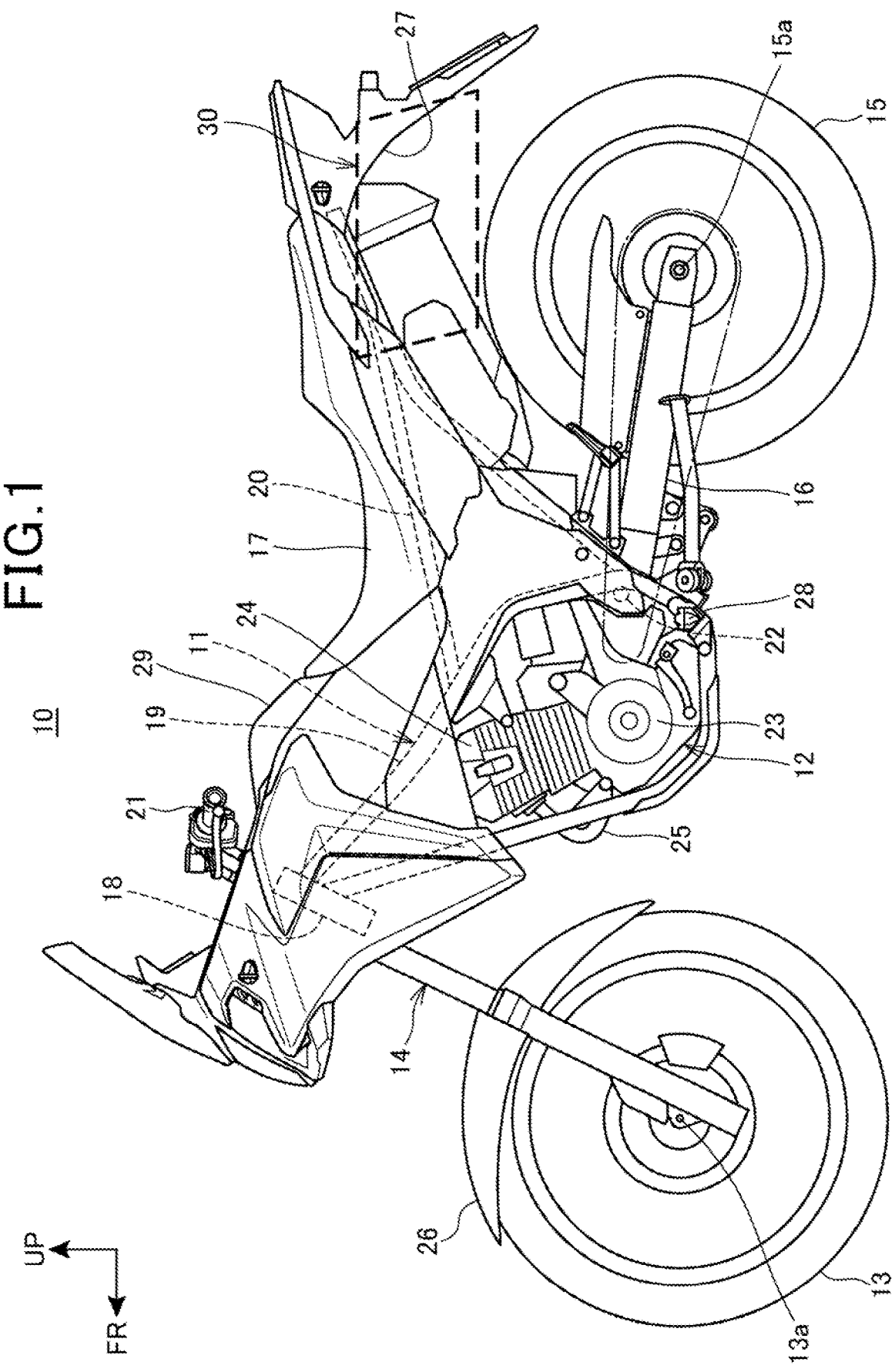
FIG. 1 is a side view of a saddle-ride vehicle according to an embodiment.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

EMBODIMENT

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The saddle-ride vehicle 10 includes a pair of storage boxes 30 in a rear part of the vehicle.

Figure 2:
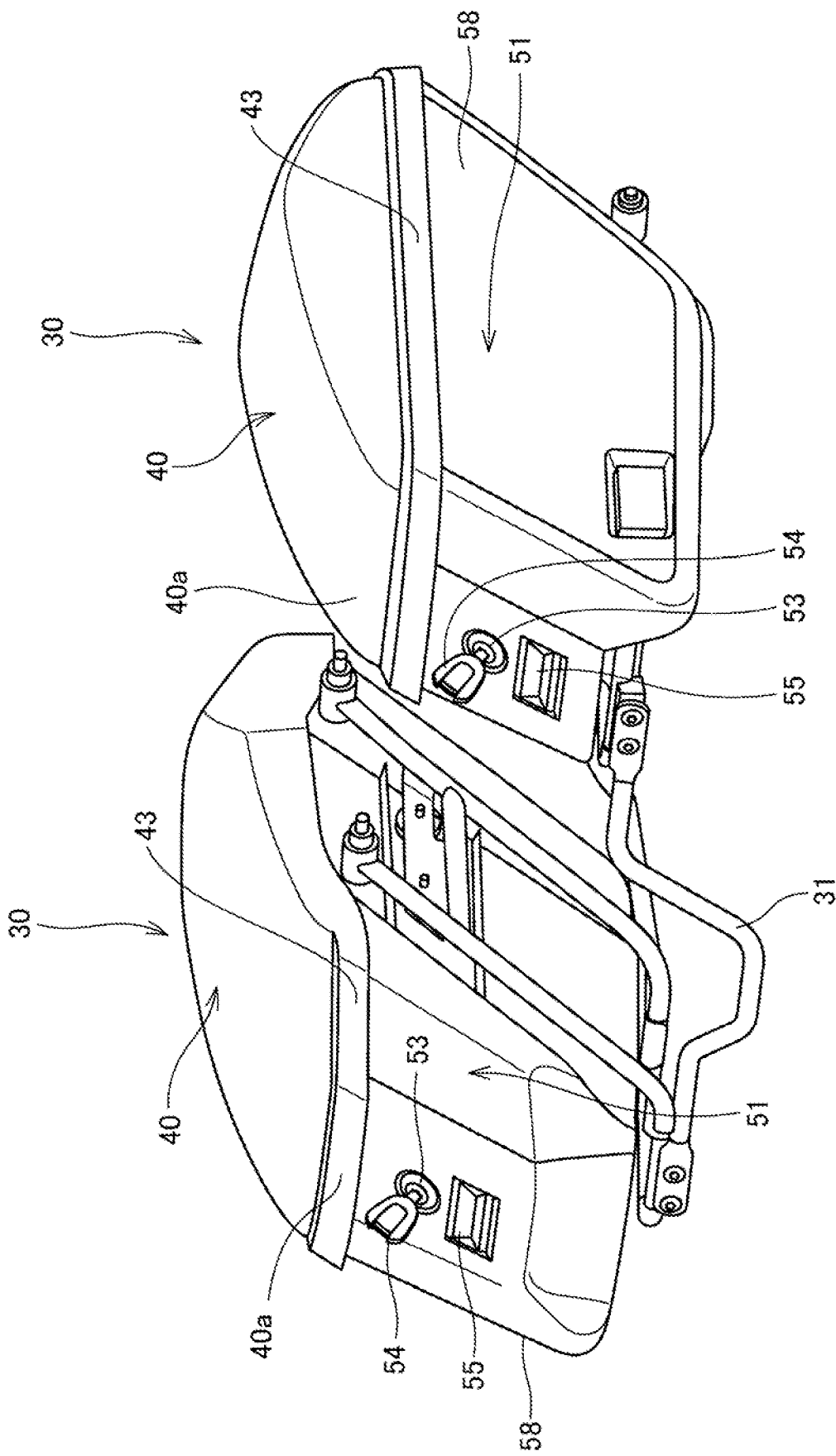
FIG. 2 is a perspective view of storage boxes according to the embodiment.

FIG. 2 is a perspective view of the storage boxes 30.

The storage boxes 30 are attached to right and left side faces of the vehicle body frame 11 through an attachment member 31 having a pipe shape.

The right and left storage boxes 30 have the same structure. Thus, hereinbelow, the storage box 30 attached to the right side face will be described, and the same parts between the right and left storage boxes 30 are designated by the same reference signs to omit description for the storage box 30 attached to the left side face.

The storage box 30 includes a lid member 40, and a housing 51 including a storage portion.

The housing 51 is a box-shaped member with its top open. The lid member 40 is hinge-coupled to a front portion of the housing 51 and opened by lifting a rear portion 40a of the lid member 40.

A key cylinder 53 and an operation portion 55 of a button type are disposed on a rear face of the housing 51. The operation portion 55 is pressed down to release the fixation between the rear portion 40a of the lid member 40 and a rear portion of the housing 51, which enables opening and closing of the lid member 40. A key 54 can be inserted into the key cylinder 53 and turned. When the key 54 is turned to a locking position, the storage box 30 is locked so that the fixation between the lid member 40 and the housing 51 is not released even if the operation portion 55 is pressed down.

Figure 3:
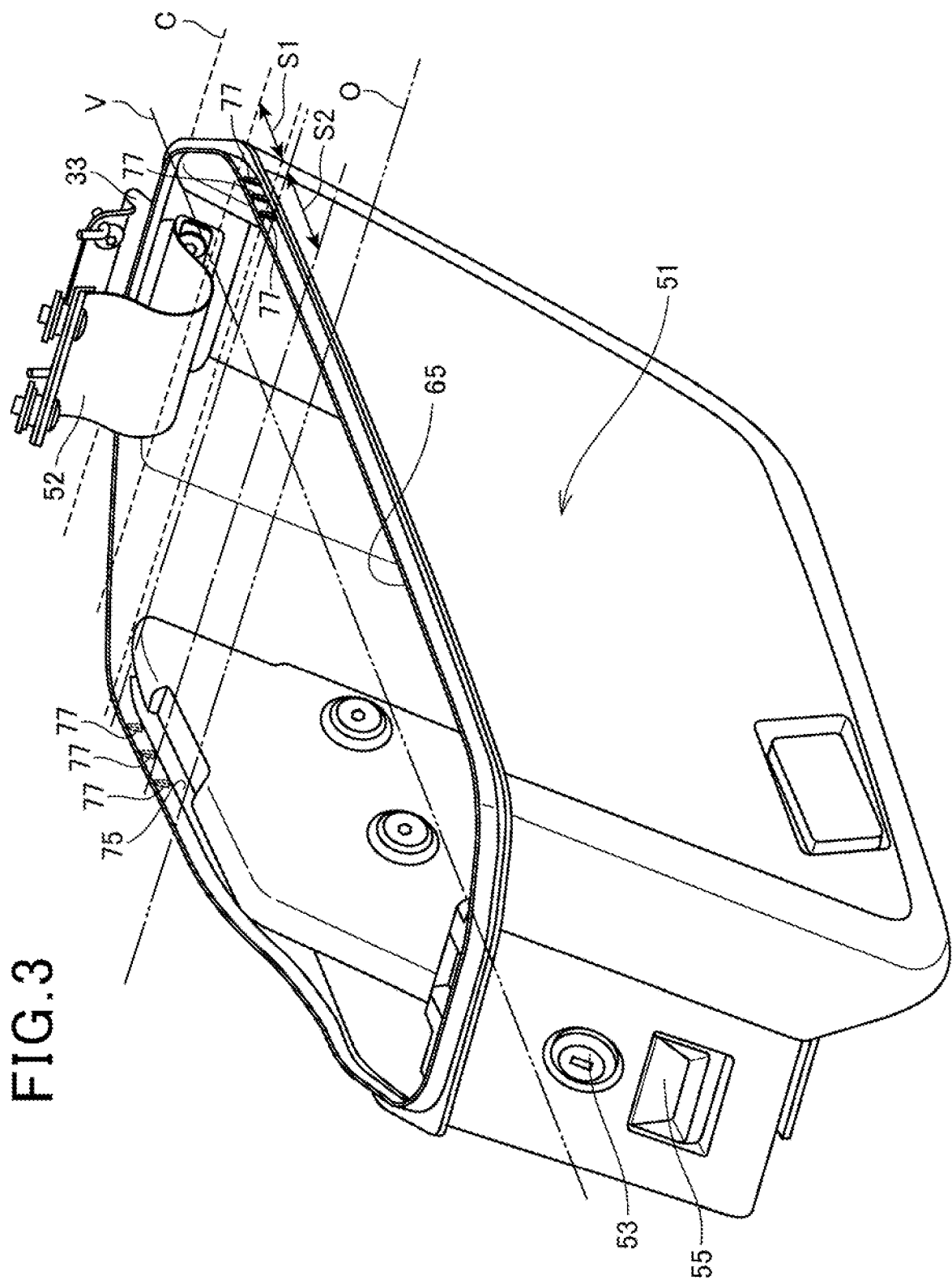
FIG. 3 is a perspective view of a housing of the storage box according to the embodiment.

FIG. 3 is a perspective view of the housing 51. The housing 51 and the lid member 40 are coupled to each other at their front portions with a hinge 33. The hinge 33 is covered with a cover 52.

Figure 4:
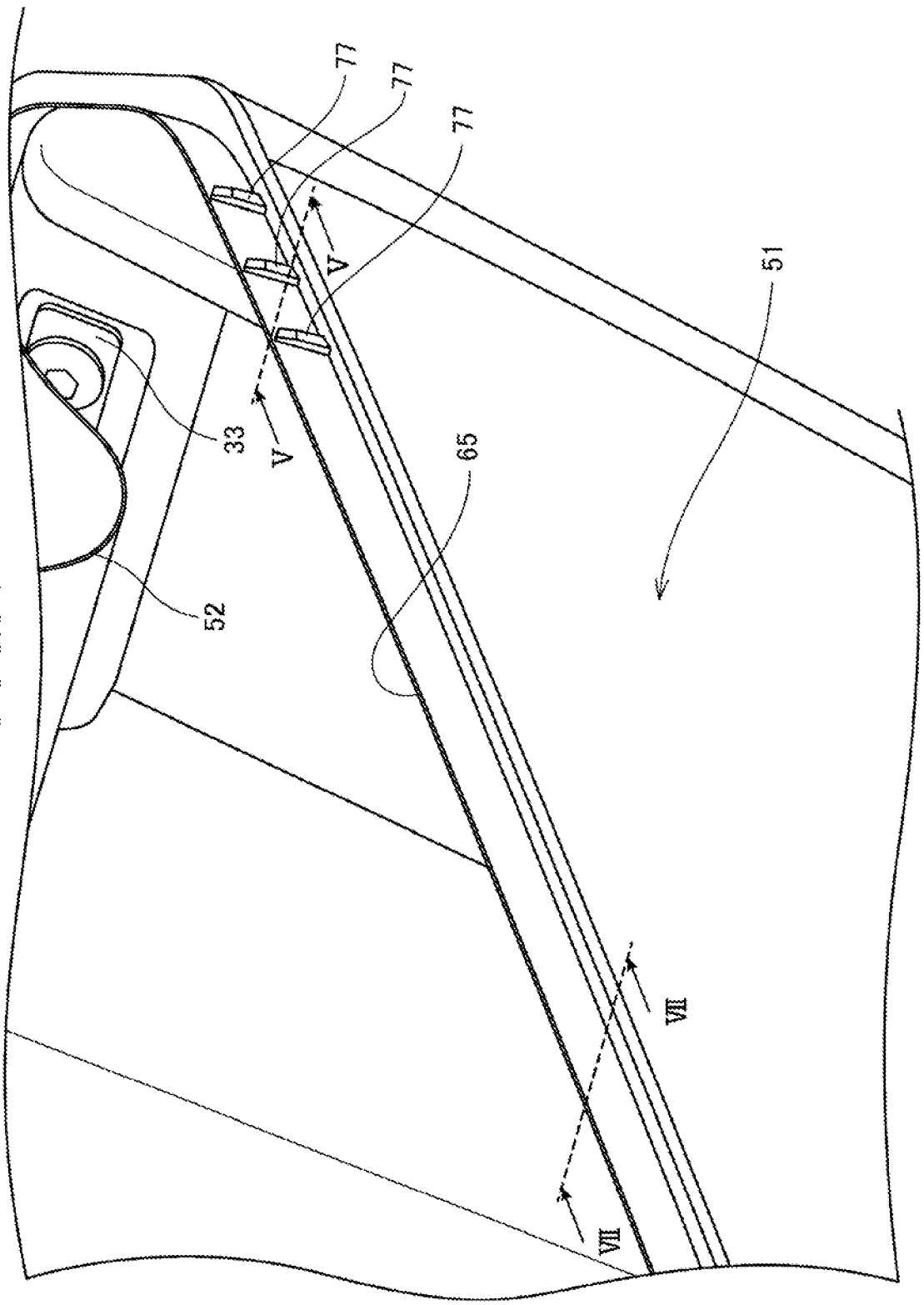
FIG. 4 is a perspective view of a centering area of the housing and its vicinity according to the embodiment.

The housing 51 has a projection 65 on an edge of the opening over substantially the entire circumference thereof. Side faces of the projection 65 have a first guide portion (guide portion) 75 and a second guide portion (guide portion) 77 in a part of the edge of the housing 51 (centering areas S1 and S2). In the present embodiment, the first guide portion 75 is provided on the inner side face of the projection 65 of the housing 51 over substantially the entire centering areas S1 and S2 and formed in such a manner as to bulge inward from the housing 51. The second guide portion 77 includes a plurality of projections extending in the vertical direction as illustrated in FIG. 4 and is provided on the outer side face of the projection 65 of the housing 51. The first guide portion 75 and the second guide portion 77 are formed in such a manner that the width of the projection 65 including the first guide portion 75 and the second guide portion 77 is larger than the width of a tip of the projection 65.

As illustrated in FIG. 3, the first guide portion 75 and the second guide portion 77 are both provided in the centering areas S1 and S2. The centering areas S1 and S2 are provided at positions where the edge of the housing 51 extends in the front-rear direction (that is, the direction intersecting a turning axis C of the turn of the lid member 40 around the hinge 33).

Also, the centering areas S1 and S2 are both provided on the front side relative to a total-length center O of the housing 51 in the front-rear direction (on one side closer to the turning axis C than the total-length center O of the housing 51 in a direction V perpendicular to the turning axis C is).

Furthermore, the centering areas S1 and S2 are provided at positions that do not overlap each other in side view of the vehicle (in the direction of the turning axis C) on the right and left edges of the housing 51.

Figure 5:
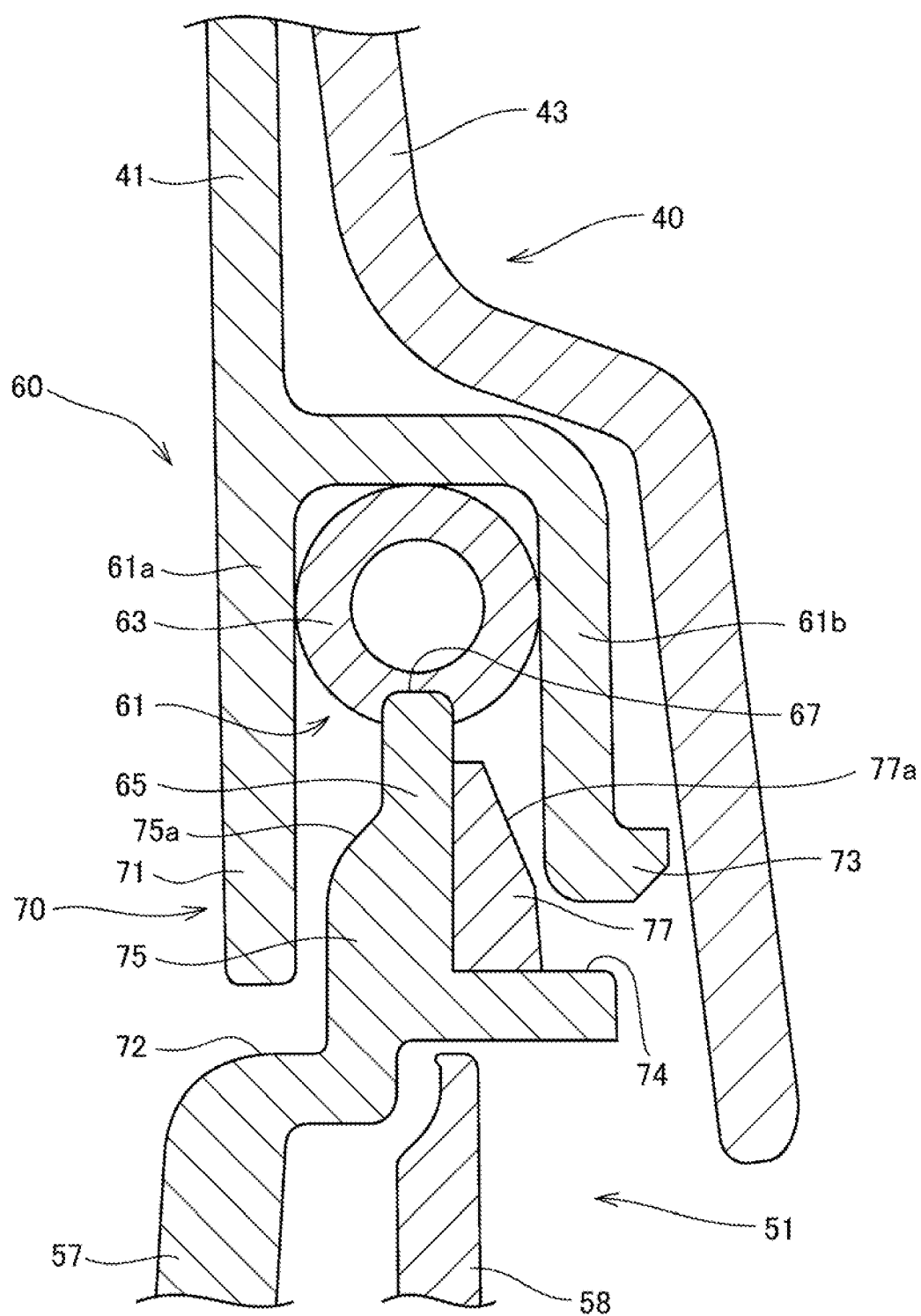
FIG. 5 is a vertical sectional view taken along line V-V of FIG. 4 in a state where a lid member is closed.

FIG. 5 is a vertical sectional view taken along line V-V of FIG. 4 in a state where the lid member 40 is closed. The V-V cross-section is included in the centering area S1. Note that the centering area S2 is similar to the centering area S1, and description thereof will thus be omitted in the following.

The housing 51 includes a housing body 57 and a housing decorative panel 58. The housing decorative panel 58 is a panel that covers an outer face of the housing body 57 to improve the appearance. The housing body 57 is a box-shaped member on which the projection 65 is formed in the housing 51. A seal rib 67 is formed on a tip portion of the projection 65. The lid member 40 includes a lid member body 41 and a lid member decorative panel 43. The lid member decorative panel 43 is a panel that covers an outer face of the lid member body 41 to improve the appearance. The lid member body 41 comes into contact with the housing body 57 of the housing 51 when the lid member 40 is closed.

On an edge of the lid member 40, the lid member body 41 includes a recess 61 defined by recess walls 61a and 61b and a hollow seal member 63 fitted inside the recess 61.

The recess 61, the seal member 63, and the projection 65 constitute a seal structure 60. In the seal structure 60, a seal rib 67 presses the seal member 63, and the pressed hollow seal member 63 deforms to fill and seal a gap between the recess 61 and the projection 65, thereby sealing the storage box 30.

In the centering area S1, the lid member 40 includes a first rib 71 and a second rib 73 on the lid member body 41. The first rib 71 and the second rib 73 respectively project downward from the recess walls 61a and 61b. The first rib 71 and the second rib 73 provided on the lid member body 41 of the lid member 40 and the first guide portion 75 and the second guide portion 77 provided on the housing body 57 of the housing 51 constitute a centering structure 70. That is, in the centering areas S1 and S2, the storage box 30 includes the centering structure 70.

The centering structure 70 positions the lid member 40 and the housing 51 by the first rib 71 and the second rib 73 respectively coming into contact with the first guide portion 75 and the second guide portion 77 when the lid member 40 is closed. That is, the first rib 71 and the second rib 73 are respectively guided by the first guide portion 75 and the second guide portion 77 in such a manner that the seal rib 67 provided on the housing body 57 of the housing 51 comes into contact with the vicinity of the center of the seal member 63 provided on the lid member body 41 of the lid member 40. This improves the sealability of the seal structure 60.

Note that the centering structure 70 can contribute to improving the sealability as long as the centering structure 70 is configured to guide at least one of the first rib 71 and the second rib 73.

The first guide portion 75 and the second guide portion 77 have a first inclined surface (inclined surface) 75a and a second inclined surface (inclined surface) 77a, respectively. The first inclined surface 75a is provided on a face facing the first rib 71 in the first guide portion 75, and the second inclined surface 77a is provided on a face facing the second rib 73 in the second guide portion 77. The first inclined surface 75a is inclined in such a manner as to laterally extend from the upper face of the first guide portion 75 toward the lower side, and the second inclined surface 77a is inclined in such a manner as to laterally extend from the upper face of the second guide portion 77 toward the lower side.

Accordingly, it is possible to prevent stress concentration that occurs when the first guide portion 75 and the second guide portion 77 come into contact with the first rib 71 and the second rib 73.

When a load is applied to the lid member 40, the first rib 71 and the second rib 73 respectively come into contact with a first rib receiving portion 72 and a second rib receiving portion 74 provided in the housing 51.

Figure 6:
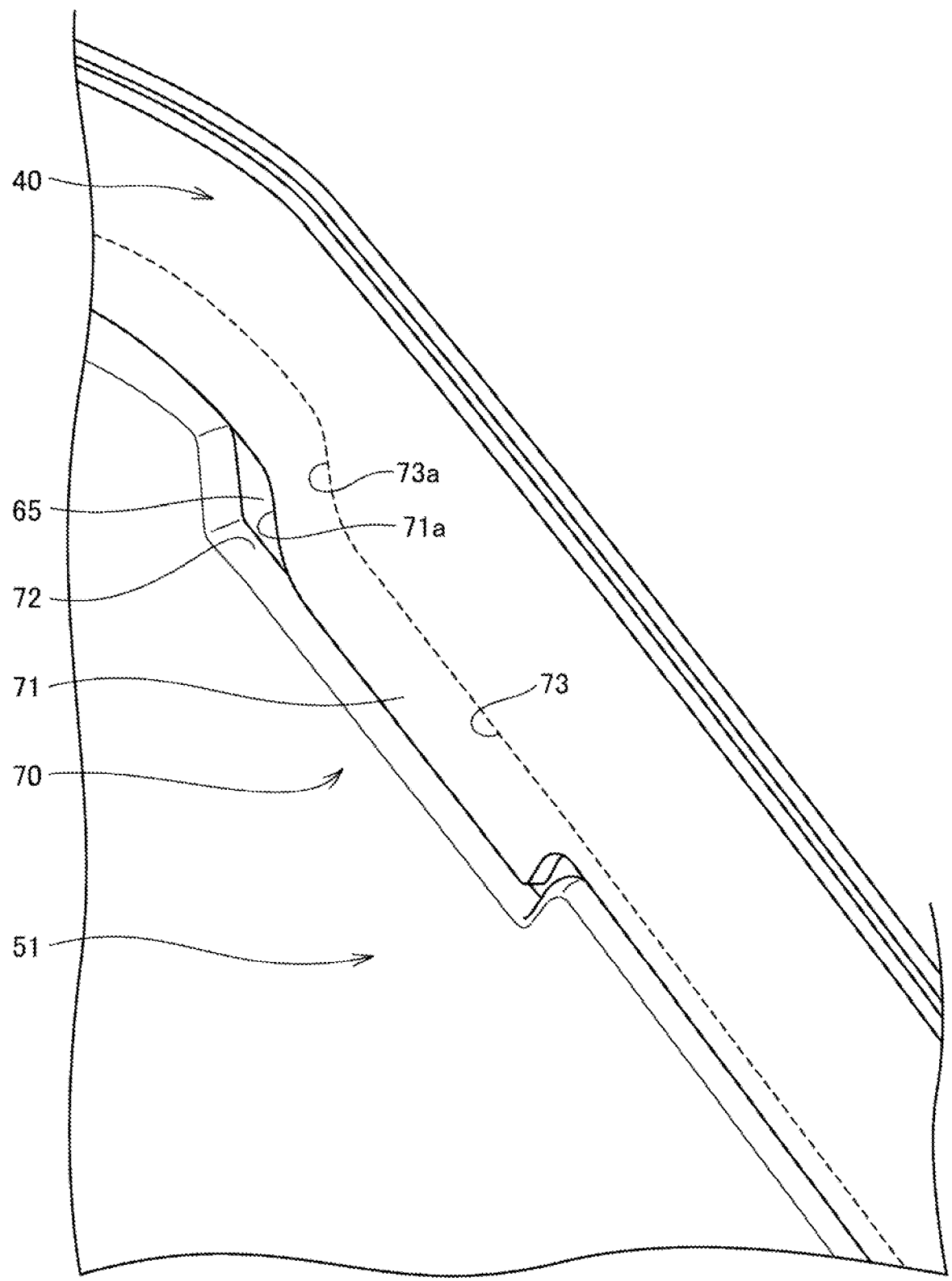
FIG. 6 is a perspective view of a centering structure according to the embodiment.

FIG. 6 is a perspective view of the centering structure 70 in a state where the lid member 40 is closed. A dotted line in the drawing is a contour line of the second rib 73.

In the centering structure 70, the first rib 71 and the second rib 73 respectively have a first inclined portion (inclined portion) 71a and a second inclined portion (inclined portion) 73a on their end portions on one side closer to the hinge 33 (on the left upper side in FIG. 6).

The first inclined portion (inclined portion) 71a and the second inclined portion (inclined portion) 73a are inclined in such a manner that the length of the first rib 71 and the length of the second rib 73 in the vertical direction become shorter in the direction closer to the hinge 33.

This prevents a stress from being concentrated on the end portions on the one side closer to the hinge 33 when the first rib 71 and the second rib 73 come into contact with the first guide portion 75 and the second guide portion 77.

Figure 7:
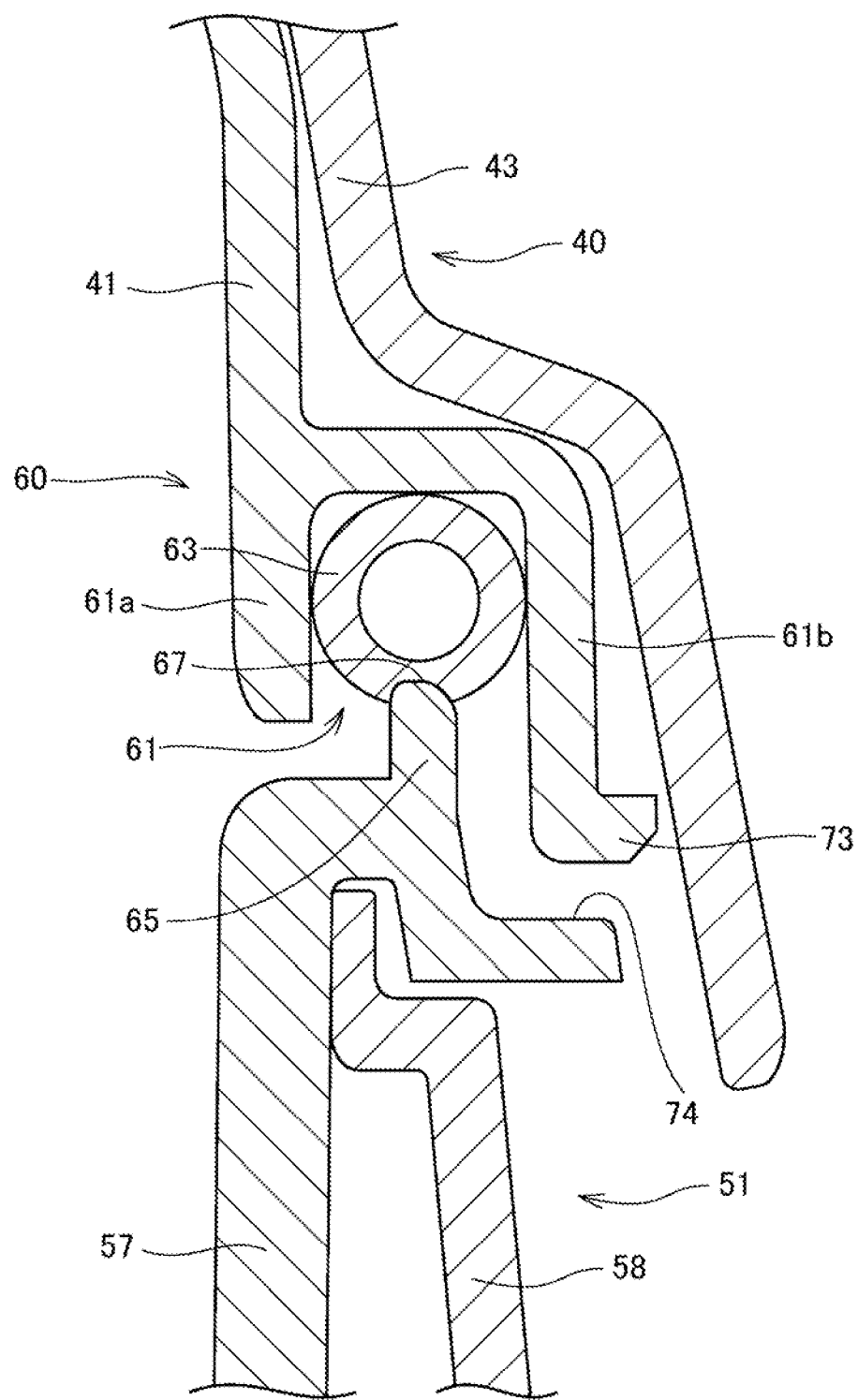
FIG. 7 is a vertical sectional view taken along line VII-VII of FIG. 4 in a state where the lid member is closed.

FIG. 7 is a vertical sectional view taken along line VII-VII of FIG. 4 in a state where the lid member 40 is closed. The VII-VII cross-section is not included in the centering areas S1 and S2.

The storage box 30 also has the seal structure 60 including the recess 61, the seal member 63, and the projection 65 on the edges of the lid member 40 and the housing 51 in an area other than the centering areas S1 and S2. Thus, sealing is also achieved by the seal structure 60 on the edges of the lid member 40 and the housing 51 in the area other than the centering areas S1 and S2.

On the other hand, the housing box 30 does not have the centering structure 70 on the edges of the lid member 40 and the housing 51 in the area other than the centering areas S1 and S2. This can reduce an area in which the centering structure 70 having a complicated structure is provided.

Figure 8:
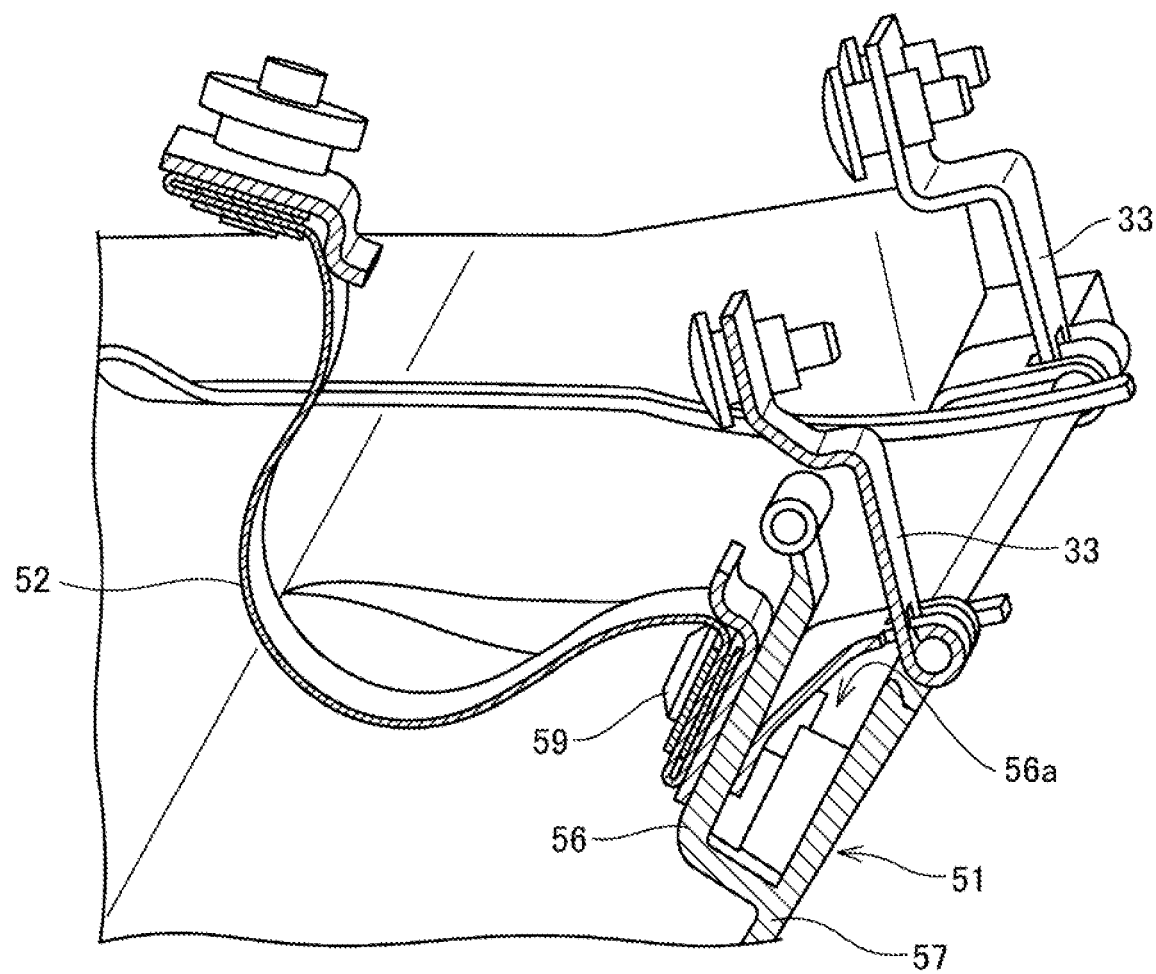
FIG. 8 is a perspective view of a hinge of the housing and its vicinity according to the embodiment.

FIG. 8 is a perspective view of the hinge 33 and its vicinity.

A front portion of the housing body 57 has a hinge fixing groove 56a defined by a hinge fixing portion 56. The hinge 33 is attached to the housing body 57 by inserting a lower side of the hinge 33 inside the hinge fixing groove 56a and fixing the hinge 33 with a screw 59 with the hinge fixing portion 56 interposed therebetween.

This makes a fixing part between the hinge 33 and the housing body 57 difficult to see, thereby improving design.

The screw 59 also fixes the cover 52 at the same time. The cover 52 has one end fixed to the hinge fixing portion 56 and the other end fixed to the lid member body 41, and restricts an opening angle of the lid member 40 and, at the same time, covers the hinge 33. Thus, the design is further improved.

An operation of the storage box 30 configured as described above in closing the lid member 40 in an open state will be described below.

When the lid member 40 is closed by turning the lid member 40 around the hinge 33, the edge of the lid member 40 and the edge of the housing 51 first come into contact with each other near the hinge 33.

When the edge of the lid member 40 and the edge of the housing 51 come into contact with each other, the seal rib 67 on the tip of the projection 65 is pressed against the hollow seal member 63 fitted in the recess 61 in the seal structure 60. Accordingly, the seal member 63 is crushed, and the collapsed seal member 63 fills the gap between the recess 61 and the projection 65, which results in firm sealing.

Next, the housing 51 and the lid member 40 also start coming into contact with each other in the centering structure 70.

In the centering structure 70, at least one of the first rib 71 and the second rib 73 first comes into contact with the first guide portion 75 or the second guide portion 77. Since the first guide portion 75 and the second guide portion 77 are wider than the tip portion of the projection 65, the first guide portion 75 and the second guide portion 77 guide at least one of the first rib 71 and the second rib 73 making contact therewith away from the seal rib 67 provided on the tip of the projection 65 so that the seal rib 67 comes into contact with the vicinity of the center of the seal member 63. Accordingly, the seal member 63 is guided in such a manner as to be crushed near the center thereof by the seal rib 67. Thus, the sealability can be improved.

Note that, since the centering structure 70 is provided closer to the turning axis C than the total-length center O in the direction V perpendicular to the turning axis C is as described above, the housing 51 and the lid member 40 also start coming into contact with each other in the centering structure 70 immediately after the lid member 40 starts closing. Thus, the sealability can also be improved near the turning axis C of the turn around the hinge 33.

As described above, the lid member 40 and the housing 51 are closed by the turn around the hinge 33. Thus, when the housing 51 and the lid member 40 start coming into contact with each other in the centering structure 70 located on one edge, the housing 51 and the lid member 40 also start coming into contact with each other in the seal structure 60 located overlapping the centering structure 70 when viewed in the direction of the turning axis C of the turn around the hinge 33 on the opposite edge.

In this case, since positioning is achieved by the centering structure 70 on the one edge, positioning of the seal member 63 and the seal rib 67 is achieved on the opposite edge even if the centering structure 70 is not provided at the position where the housing 51 and the lid member 40 start coming into contact with each other at the same time.

Thus, the centering structure 70 provided in the centering areas S1 and S2 that do not overlap each other when viewed in the direction of the turning axis C of the turn around the hinge 33 makes it possible to efficiently achieve positioning while preventing the structure from becoming complicated.

After the housing 51 and the lid member 40 come into contact with each other in the centering structure 70 provided at two locations, contact between the housing 51 and the lid member 40 also starts on the edges of the housing 51 and the lid member 40 at the side far from the hinge 33 where the centering structure 70 is not provided.

At this time, since positioning of the edges of the housing 51 and the lid member 40 has already been achieved in a part where the centering structure 70 is provided, misalignment between the seal rib 67 and the seal member 63 is also prevented in the remaining part.

Thus, even if the centering structure 70 is not provided over the entire circumference of the edges of the housing 51 and the lid member 40, effective positioning can be achieved over a wide area of the edges of the housing 51 and the lid member 40.

Then, the edge of the housing 51 and the edge of the lid member 40 opposite to the hinge 33 come into contact with each other to close the housing 51 and the lid member 40.

Note that, in the configuration described above, the elements provided in the lid member 40 may be provided in the housing 51, and the elements provided in the housing 51 may be provided in the lid member 40.

For example, the lid member body 41 of the lid member 40 may include the projection 65, the first guide portion 75, and the second guide portion 77, and the housing body 57 of the housing 51 may include the recess 61, the seal member 63, the first rib 71, and the second rib 73.

As described above, according to the embodiment to which the present invention is applied, the seal structure 60 of the storage box 30 includes the recess 61, the seal member 63 provided in the recess 61, and the projection 65 that comes into contact with the seal member 63 for sealing, and has, at the opening, the centering structure 70 for guiding opening and closing of the lid member 40. The centering structure 70 includes the first rib 71 and the second rib 73 projecting from the opposite edges of the recess 61, and the first guide portion 75 and the second guide portion 77 that guide at least one of the first rib 71 and the second rib 73 at opening and closing.

According to this configuration, in closing the lid member 40, the centering structure 70 can position the projection 65 and the seal member 63. Thus, the sealability can be improved.

The first guide portion 75 and the second guide portion 77 guide both the first rib 71 and the second rib 73.

According to this configuration, in closing the lid member 40, the projection 65 and the seal member 63 can be more firmly positioned by the first guide portion 75 and the second guide portion 77 guiding both the first rib 71 and the second rib 73. Thus, the sealability can be more significantly improved.

The seal member 63 is hollow, and the seal rib 67 formed on the projection 65 presses the seal member 63 to seal the gap between the recess 61 and the projection 65.

According to this configuration, the seal rib 67 positioned by the centering structure 70 largely crushes the hollow seal member 63, and the crushed seal member 63 can fill the gap between the recess 61 and the projection 65. This enables firm sealing and improves the sealability.

The centering structure 70 is provided in the direction intersecting the turning axis C of the lid member 40 in the storage box 30 and provided closer to the turning axis C than the total-length center O of the storage box 30 in the direction V perpendicular to the turning axis C is.

According to this configuration, the projection 65 and the seal member 63 can be positioned immediately after the lid member 40 starts closing. Thus, the sealability can also be improved near the rotation center C.

The centering structure 70 is provided at positions that do not overlap each other in the direction of the turning axis C of the lid member 40 in the storage box 30.

According to this configuration, the area in which the centering structure 70 is provided can be narrowed, and the sealability can be improved with a simplified structure.

The first rib 71 and the second rib 73 have the first inclined portion 71a and the second inclined portion 73a on the side closer to the turning axis C.

According to this configuration, it is possible to prevent a strong load from being applied to the first rib 71 and the second rib 73 on the side closer to the turning axis C when the lid member 40 is closed. Thus, it is possible to improve the durability of the centering structure 70 and improve the sealability for a long period of time.

The first guide portion 75 and the second guide portion 77 have the first inclined surface 75a and the second inclined surface 77a on the faces facing the first rib 71 or the second rib 73.

According to this configuration, it is possible to prevent stress concentration that occurs when the first guide portion 75 and the second guide portion 77 come into contact with the first rib 71 or the second rib 73 when the lid member 40 is closed. Thus, it is possible to improve the durability of the centering structure 70 and improve the sealability for a long period of time.

Configurations Supported by the Above Embodiment

The above embodiment supports the following configurations.

(Configuration 1) A storage box seal structure including: a recess; a seal member provided in the recess; and a projection that comes into contact with the seal member for sealing, in which the storage box seal structure has, at an opening, a centering structure for guiding opening and closing of a lid member, and the centering structure includes a first rib and a second rib projecting from opposite edges of the recess, and a guide portion that guides at least one of the first rib and the second rib at opening and closing.

According to this configuration, in closing the lid member, the centering structure can position the projection and the seal member. Thus, the sealability can be improved.

(Configuration 2) The storage box seal structure according to configuration 1, in which the guide portion guides both the first rib and the second rib.

According to this configuration, in closing the lid member, the projection and the seal member can be more firmly positioned by the guide portion guiding both the first rib and the second rib. Thus, the sealability can be more significantly improved.

(Configuration 3) The storage box seal structure according to configuration 1 or 2, in which the seal member is hollow, and a seal rib formed on the projection presses the seal member to seal a gap between the recess and the projection.

According to this configuration, the seal rib positioned by the centering structure largely crushes the hollow seal member, and the crushed seal member can fill the gap between the recess and the projection. This enables firm sealing and improves the sealability.

(Configuration 4) The storage box seal structure according to any one of configurations 1 to 3, in which the centering structure is provided in a direction intersecting a turning axis of the lid member in a storage box and provided closer to the turning axis than a total-length center of the storage box in a direction perpendicular to the turning axis is.

According to this configuration, the projection and the seal member can be positioned immediately after the lid member starts closing. Thus, the sealability can also be improved near the rotation center.

(Configuration 5) The storage box seal structure according to any one of configurations 1 to 4, in which the centering structure is provided at positions that do not overlap each other in a direction of the turning axis of the lid member in the storage box.

According to this configuration, the area in which the centering structure is provided can be narrowed, and the sealability can be improved with a simplified structure.

(Configuration 6) The storage box seal structure according to configuration 4, in which the first rib and the second rib have inclined portions on the side closer to the turning axis.

According to this configuration, it is possible to prevent a strong load from being applied to the first rib and the second rib on the side closer to the turning axis when the lid member is closed. Thus, it is possible to improve the durability of the centering structure and improve the sealability for a long period of time.

(Configuration 7) The storage box seal structure according to any one of configurations 1 to 6, in which the guide portion has an inclined surface on a face facing the first rib or the second rib.

According to this configuration, it is possible to prevent stress concentration that occurs when the guide portion comes into contact with the first rib or the second rib when the lid member is closed. Thus, it is possible to improve the durability of the centering structure and improve the sealability for a long period of time.

REFERENCE SIGNS LIST 10 saddle-ride vehicle
30 storage box
40 lid member
61 recess
63 seal member
65 projection
67 seal rib
70 centering structure
71 first rib
71a first inclined portion (inclined portion)
73 second rib
73a second inclined portion (inclined portion)
75 first guide portion (guide portion)
75a first inclined surface (inclined surface)
77 second guide portion (guide portion)
77a second inclined surface (inclined surface)
C turning axis
V direction
O total-length center

What is claimed is:

1. A storage box seal structure in which a storage box includes: a housing including an opening; and a lid member that rotates around a turning axis provided at a front portion of the housing and that is openable and closeable by an operation portion provided at a rear portion of the housing, the storage box seal structure comprising:
   a recess provided to the lid member;
   a seal member provided in the recess; and
   a projection that is provided at a periphery of the opening of the housing and that comes into contact with the seal member for sealing, wherein
   the storage box seal structure has, at the opening, a centering structure for guiding opening and closing of the lid member,
   the centering structure includes a guide portion that comes into contact with a first rib and a second rib projecting from opposite edges of the recess of the lid member and that guides at least one of the first rib and the second rib at opening and closing, and
   the guide portion is provided, in the periphery of the housing, closer to the turning axis than a total-length center of the storage box in a direction perpendicular to the turning axis is.

2. The storage box seal structure according to claim 1, wherein the guide portion guides both the first rib and the second rib.

3. The storage box seal structure according to claim 1, wherein
   the seal member is hollow, and
   a seal rib formed on the projection presses the seal member to seal a gap between the recess and the projection.

4. The storage box seal structure according to claim 1, wherein the centering structure is provided in a direction intersecting the turning axis of the lid member in the storage box.

5. The storage box seal structure according to claim 1, wherein the centering structure is provided at positions that do not overlap each other in a direction of the turning axis of the lid member in the storage box.

6. The storage box seal structure according to claim 4, wherein the first rib and the second rib have inclined portions on the side closer to the turning axis.

7. The storage box seal structure according to claim 1, wherein the guide portion has an inclined surface on a face facing the first rib or the second rib.

8. The storage box seal structure according to claim 1, wherein a pair of the centering structures are provided at left and right edges in the periphery of the opening of the housing, the left and right edges intersecting the turning axis.

* * * * *